United States Patent
Mullen et al.

(10) Patent No.: US 6,873,886 B1
(45) Date of Patent: *Mar. 29, 2005

(54) MODULAR MISSION PAYLOAD CONTROL SOFTWARE

(75) Inventors: Robert E. Mullen, Bedford, IN (US); Keith D. Milhouse, Bloomington, IN (US); Paul L. Schmidt, Bloomfield, IN (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 43 days.

This patent is subject to a terminal disclaimer.

(21) Appl. No.: 10/307,534

(22) Filed: Nov. 27, 2002

(51) Int. Cl.$^7$ .............................................. G06F 17/00
(52) U.S. Cl. ............................................ 701/2; 701/36
(58) Field of Search .......................... 701/2, 3, 33, 36; 244/189, 190; 709/203, 217, 219

(56) References Cited

U.S. PATENT DOCUMENTS

| | | | | |
|---|---|---|---|---|
| 6,175,783 | B1 * | 1/2001 | Strength et al. | 701/13 |
| 6,377,860 | B1 * | 4/2002 | Gray et al. | 700/83 |
| 6,429,773 | B1 * | 8/2002 | Schuyler | 340/425.5 |
| 6,487,717 | B1 * | 11/2002 | Brunemann et al. | 717/173 |
| 6,665,594 | B1 * | 12/2003 | Armstrong | 701/13 |

FOREIGN PATENT DOCUMENTS

JP        2002-46554    *   2/2002

* cited by examiner

Primary Examiner—Michael J. Zanelli
(74) Attorney, Agent, or Firm—Mark Homer

(57) ABSTRACT

The present application discloses an open system architecture and software system for plug and play modular mission payloads in aerial vehicles. The improved software moves the control function of mission payloads away from the ground station and into the aerial vehicle. The plug & play web-based payload interface software resides in a payload interface controller in the vehicle, and this is networked via a uniform resource locator (URL) address to a ground control station. Consequently, when new payloads are added to the system, integration issues and costs are minimized.

8 Claims, 6 Drawing Sheets

MODULAR MISSION PAYLOAD CONTROL SOFTWARE

CROSS-REFERENCE TO RELATED APPLICATIONS

The present application relates to software for use in hardware described in U.S. patent application Ser. No. 10/012,613, now U.S. Pat. No. 6,665,594, entitled Plug and Play Modular Mission Payloads.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates to the computer control of mission payloads in unmanned aerial vehicles and, more particularly, to server-side and web-based payload interface control software that resides in a payload interface controller (PIC) in the vehicle and which is networked via a uniform resource locator (URL) address to the control station.

2. Description of the Background

Unmanned vehicles (UVs) in operation today are designed around a single mission payload. The payload is located in the UV and is controlled remotely using a Human Computer Interface (HCI) connected at a Tactical Control Station (TCS). Other control components include the aircraft's Vehicle Management System (VMS), aircraft Air Data Terminal (ADT), Ground Control Station (GCS) Ground Data Terminal (GDT), UAV Data Control Processor (DCP), and finally, a TCS Non-Real Time Processor. Given the current configuration and architecture, implementing a new payload in the UV is exceedingly difficult and requires changing software in the VMS, DCP and TCS along with designing a new HCI. This is costly, time consuming and requires a complete flight re-certification process for each new payload introduced to the UAV. Over the lifetime of UAV, this could amount to more than 10 payloads and many wasted hours. In addition to the traditional Electro-Optic Payloads, users are now looking at Synthetic Aperture Radar payloads, Signal Intelligence payloads, Data Relay and Networking payloads, Meteorological payloads, Hyperspectral payloads, and other mission payloads. Each of these payloads has significantly different command and control functions, different human-computer interfaces, different data processing requirements, and they provide complex and differing data products and images to the UV operators. Current UV system designs do not incorporate the commands to manipulate these payloads and are not capable of processing and exploiting the data types. Thus, each time a UV is modified to accommodate a payload, physical changes must be made to either the payload or vehicle, and software must be changed in the vehicle and the control station, and in the ground station communication datalink. These software changes to the vehicle, and control station, and datalink also require costly air safety recertification.

The problem is becoming especially apparent as the increasing capability, quantity and awareness of UAVs, and the desire to utilize UAVs for expanded roles becomes more prevalent. There is a great need for a common interface for all payloads that may be carried by the UAV, and an open systems architecture to facilitate the integration of new and differing payloads, and which provides higher performance and minimal obsolescence. The same problem has arisen in other contexts, and there have been limited efforts to provide a solution. For example, U.S. Pat. No. 6,175,783 to Stength et al. confronts the problem in the context of outer space vehicles which have payload facilities supported by a host computer system at a space platform. The '783 patent attempts to take application-specific payload controllers and make them generic networked computers with payload control software resident on a remote space vehicle. Similarly, U.S. Pat. No. 5,271,582 to Perkins et al. discloses a communication system for an unmanned space vehicle for electronically communicating with various diverse customer payloads. Multiple subsidiary small payloads can be connected to standard mechanical and electrical interfaces. However, this only partially addresses the problems of reconfiguration, recertification and obsolescence.

Co-pending U.S. patent application Ser. No. 10/012,613 discloses a system architecture in which the air vehicle versus payload commands are separated by taking the payload interface software out of the TCS Software in the GCS and having it reside in a payload interface controller (PIC). The PIC interfaces with each payload according to that payload's unique interface.

The present application provides Modular Mission Payload Control Software (MMPCS) suitable for use in the above-referenced architecture.

SUMMARY OF THE INVENTION

It is an object of the present invention to provide Modular Mission Payload Control Software (MMPCS) suitable for use in the above-referenced architecture. It is another object to provide Modular Mission Payload Control Software (MMPCS) resident in a payload interface controller (PIC) in the UAV which interfaces with each payload according to that payload's unique interface.

It is another object to provide a Payload Operator with the ability to control the payloads by programming the Modular Mission Payload Control Software (MMPCS) which is resident in a payload interface controller (PIC) in the UAV via a web page presented in a standard web browser with appropriate plug-ins installed.

It is another object to provide MMPCS as above which minimizes software changes for new and different payloads by moving the payload-specific software changes away from all flight critical software.

According to the present invention, the above-described and other objects are accomplished by providing Modular Mission Payload Control Software (MMPCS) suitable for use in the PIC and capable of controlling each payload according to that payload's unique interface. The MMPCS has a program loader and executive with ability to execute server-side control modules for each particular payload. The server-side software has a "identify module" which compares communications over the payload interface controller's common connectors against payload-specific data parameter for each known payload and loads the server-side control module to communicate with and control that unique payload. The identity module also writes a properties file at the payload interface controller's URL, which contains a list of currently connected payloads and which is used to load client-side web-based plug-in modules. In this manner, an operator can remotely control one or more payloads from the ground station via a computer, display, and wireless communication link which provides a remote human computer interface (HCI). All server-side control software is programmed in C and C++ and client-side ground control software is programmed using Java and HTML. This way, the operator is presented a standard web browser with appropriate plug-ins installed, as required, for each new payload. When the payload operator transmits a payload command via the web browser screen, the payload interface controller interprets the command and calls the payload specific command to the proper payload via a standard interface protocol. The benefit of this approach is that it minimizes software changes required for full flight certification by moving the software changes away from the flight critical software and hardware.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The Modular Mission Payload Control Software (MMPCS) according to the present invention is incorporated in the system architecture set forth in co-pending U.S. patent application Ser. No. 10/012,613, which discloses a high-level restructuring of conventional payload communication systems as repeated below.

Figure 1:
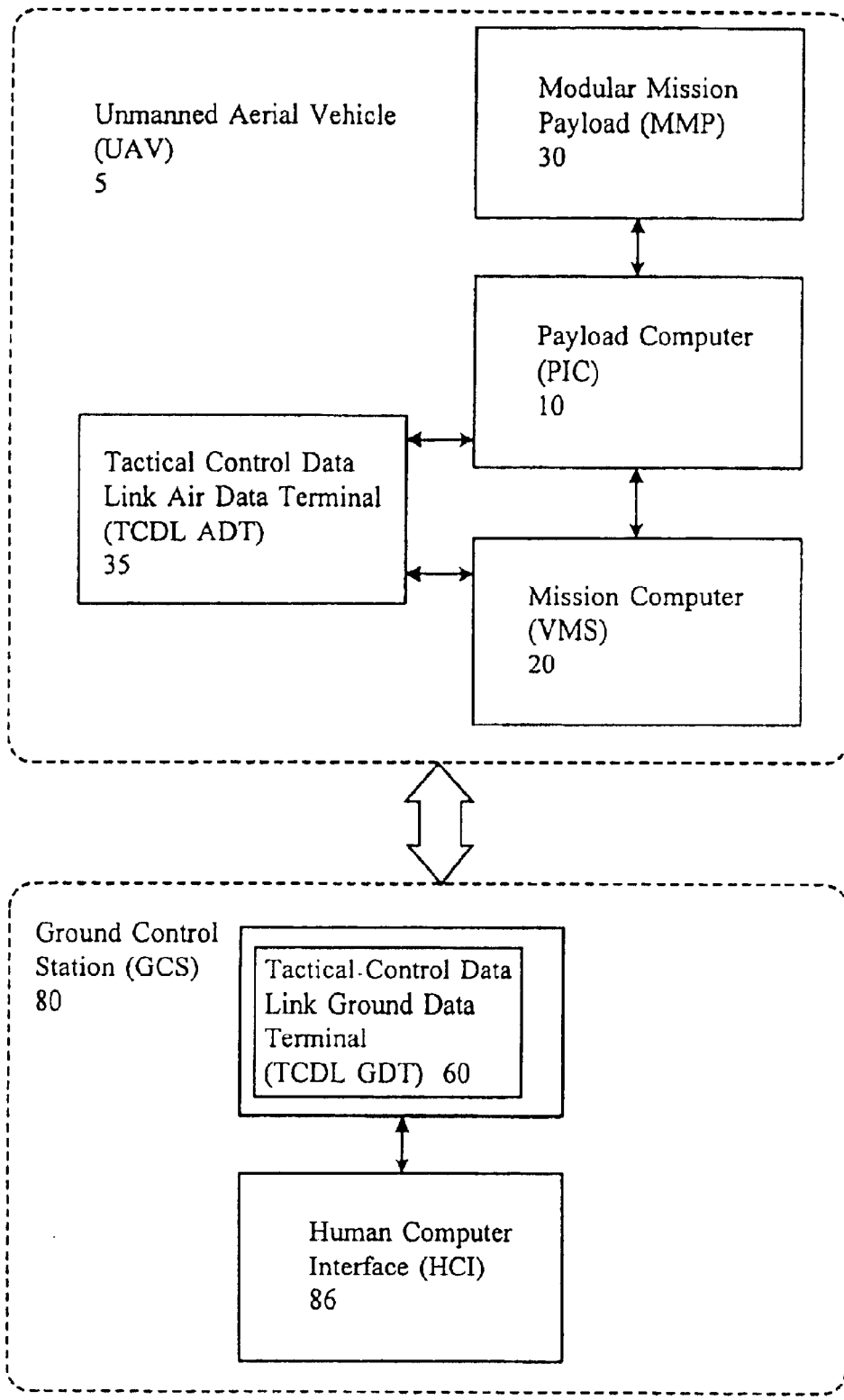
FIG. 1 is a conceptual block diagram illustrating the open system architecture with plug & play (PnP) payload interface according to the present invention.

FIG. 1 is a conceptual block diagram illustrating the system architecture. An existing unmanned aerial vehicle 5 is equipped with an existing modular mission payload (MMP) 30 located in the aerial vehicle 5. In accordance with the present invention, the MMP 30 is connected by high-speed data bus to a dedicated payload interface controller (PIC) 10 that is also located in the aerial vehicle 5. Payload interface controller (PIC) 10 is a substantially conventional PC networked to the existing mission computer 20 that is also resident on the unmanned aerial vehicle 5. Both the mission computer 20 and payload interface controller (PIC) 10 are provided with a common communication interface in the aerial vehicle 5, and this may be the existing tactical common data link air data terminal (TCDL ADT) 35. With this configuration, the communication interface 35 provides a wireless communication uplink for remote control of the aerial vehicle 5 via mission computer 20, as well as for remote control of the modular mission payload (MMP) 30 via payload interface controller (PIC) 10. The communication interface 35 also provides a communication downlink for transmitting vehicle and sensor data to the control station 80. The ground control station 80 and associated control equipment (to be described) is equipped with Human Computer Interface (HCI) 86 by which an operator can interactively control both the mission payload 30 functions as well as the control functions of the aerial vehicle 5. To fully implement the plug & play goal of the software of the present invention, the payload interface controller (PIC) 10 is configured as a network server and the Human Computer Interfaces (HCI) 86 as a network client. The payload interface controller (PIC) 10 is pre-loaded with the present control software, which is capable of executing commands required to control all established payloads. In addition, existing software is provided at the Human Computer Interface (HCI) 86 that provides a standard graphical interface used to control all established payloads.

Figure 2:
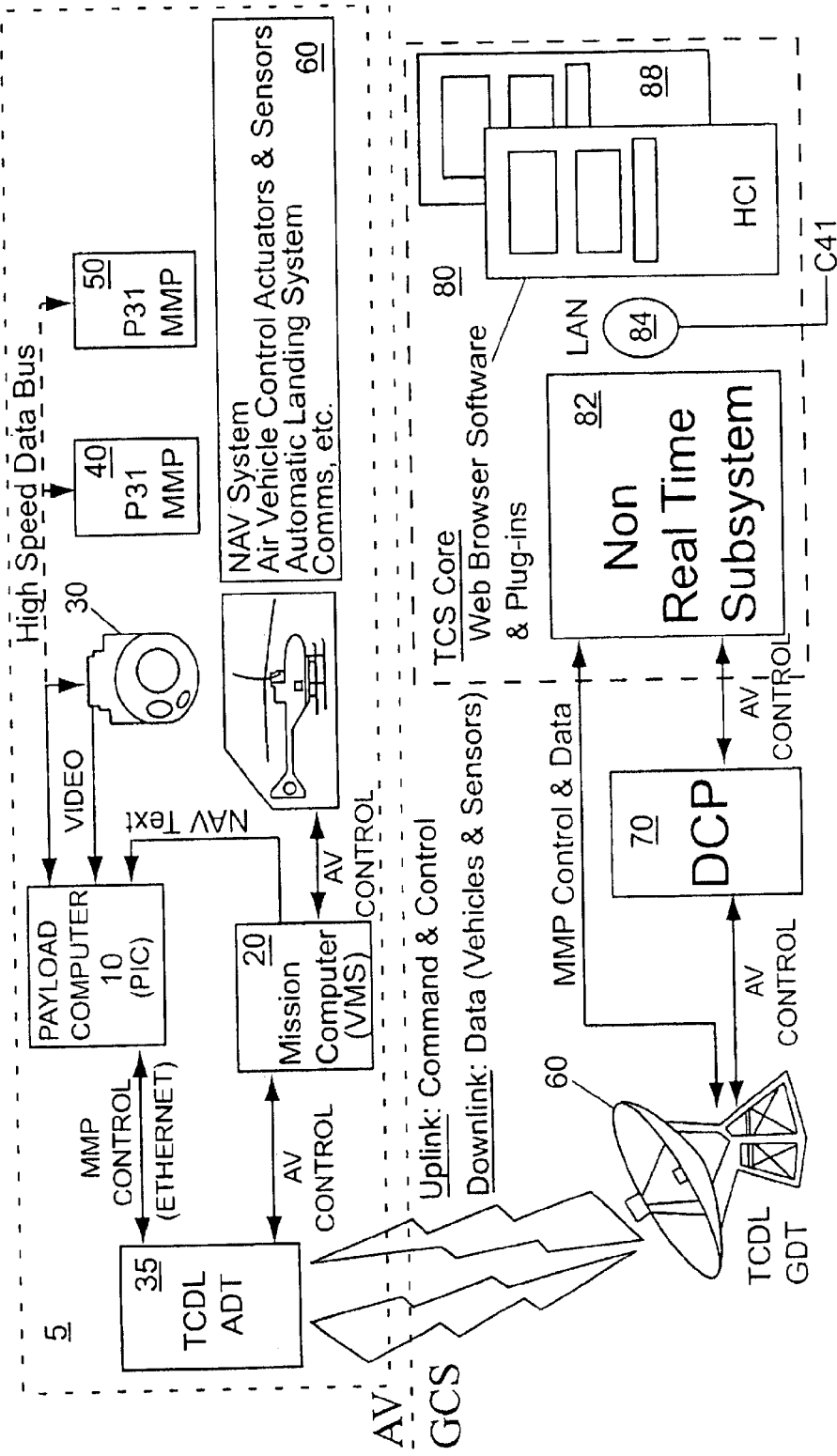
FIG. 2 is a more detailed block diagram illustrating the hardware and software components necessary for implementing the system of FIG. 1.

FIG. 2 is a more detailed block diagram illustrating the hardware components necessary for implementing the software of the present invention. For exemplary purposes, the system is disclosed in the context of a vertical take-off and landing tactical unmanned aerial vehicle 5 (VTUAV) such as the Firescout. One or more modular mission payloads (MMPs) 30, 40, 50 may be located in the aerial vehicle 5 and all are connected by high-speed data bus for control by an on-board payload interface controller (PIC) 10 (MMP 30 is herein shown to be a traditional Electro-Optic Payload). Payload interface controller (PIC) 10 is networked to the mission computer 20 that is also resident on the unmanned aerial vehicle 5 via standard RS-422 link or the like. The mission computer 20 effectively controls the aerial vehicle in a known manner via connections to the vehicle control actuators, landing system, sensors, actuators, etc. Both the mission computer 20 and payload interface controller (PIC) 10 are linked to and provided with a common communication interface 30 at the aerial vehicle 5, this being designated as the tactical common data link air data terminal (TCDL ADT). The communication interface 35 provides a communication uplink for remote control of the aerial vehicle 5 via mission computer 20, as well as for remote control of the modular mission payloads (MMPs) 30, 40, 50 via payload interface controller (PIC) 10. The communication interface 35 also provides a communication downlink for transmitting vehicle and sensor data to the ground control station 80. Uploading/downloading is accomplished through a tactical common data link ground data terminal 60 (TCDL GDT) that is connected via an existing Datalink Control Processor (DCP) 70 to the tactical control station (TCS) core ground control station 80. The tactical control station 80 further comprises a Non-Real-Time Processor 82 networked by LAN connection C4I to one or more Human Computer Interfaces (HCIs) 86, 88. In this manner, an operator can interactively control both the mission payload 30–50 functions as well as the control functions of the aerial vehicle 5 from any of the Human Computer Interfaces (HCIs) 86, 88. It can be seen that implementing a new payload in the aerial vehicle 5 using the above-described system configuration does not necessarily require changing software in the mission computer (VMS) 20 or the Datalink Control Processor (DCP) 70, and as will be seen it does not require any reprogramming of the Non-Real-Time Processor 82 nor any new Human Computer Interfaces (HCIs) 86, 88.

Figure 3:
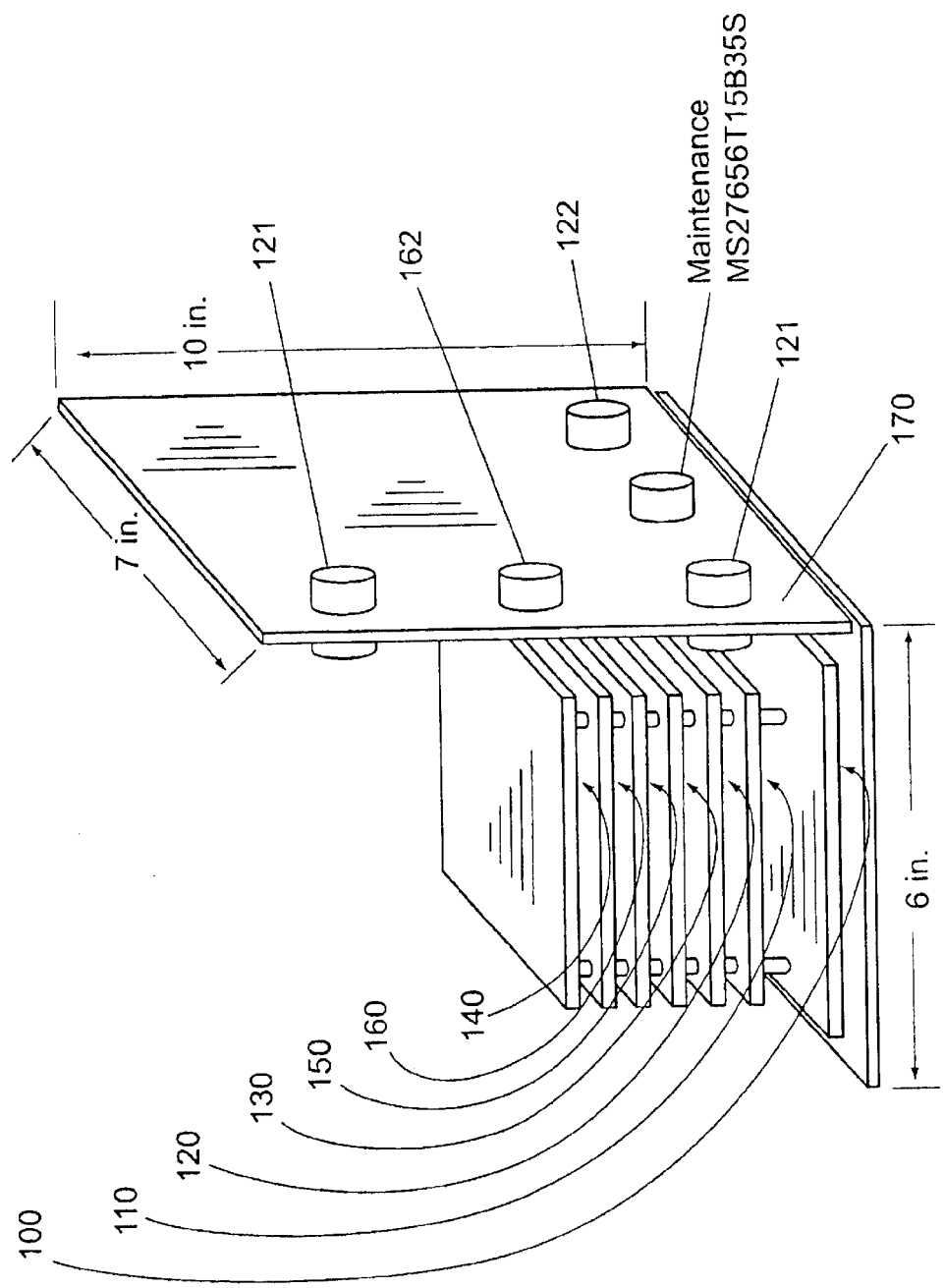
FIG. 3 is a block diagram of the payload interface controller (PIC) 10 in accordance with the above-described architecture.

FIG. 3 is an assembly diagram of the payload interface controller (PIC) 10, which comprises a variety of commercially available components procured and assembled with the following configuration:

MPEG-2 Transport Stream Encoder 100

Processor Board 110

Power Supply 160 coupled to power input port 162

4 Port Serial Board 130 coupled to the payload connectors 121 with an integrated 10 Base-T ethernet adapter 122.

Serial Interface Board 120 coupled to two RS-422 interfaces.

Hard Disk Drive 140

VGA Board 150 (optional)

Enclosure 170

All of the foregoing boards may be Industry Standard PC-104 boards.

The Processor Board 110 is preferably at least a Pentium central processor with RAM and standard supporting chipset. Sufficient RAM is required to fully load all interface modules, and 256 MB will suffice.

The Hard Disk Drive 140 is preloaded with an operating system (OS) which is preferably Red Hat Linux 6.2, with TimeSys Linux/RT real-time extensions. This OS was selected due to the availability of drivers for a wide range of devices, and the fact that virtually all device drivers are provided with source code and can be modified without restrictions. The real-time extensions are not used for task scheduling or resource allocations, but they do provide the capability of conveniently scheduling serial control messages to certain payloads such as a Wescam 12DS Daylight Television (DLTV) and Forward Looking Infra-Red (FLIR) imager. In addition, sufficient hard disk space or other non-volatile memory is required for web page storage.

The Power Supply Module 160 may be a conventional regulated AC/DC power supply.

The RS-422 Interface Board 120, Serial Interface Board 130 and Hard Disk Drive 140 are all industry standard components.

The MPEG-2 Transport Stream Encoder 100 is a MPEG-2 TS video frame grabber for MPEG-2 TS encoding of video data.

VGA Board 150 is a conventional VGA output board which is optional and was used for development purposes only. VGA Board 150 may be included to provides complete VGA and NTSC/PAL TV-OUT output for monitoring purposes.

The two payload connectors 121 are physically wired identically and are the interfaces to the actual payloads. The power connector 162 is the input power source to the payload interface controller (PIC) 10. The ethernet connector 122 provides datalink connectivity. The maintenance connector provides keyboard and VGA access to the system for a development environment.

The custom enclosure 170 preferably leaves open bays for spare modules which may include other interface boards such as IEEE-1394 Firewire, MIL-STD-1553B, etc.

Figure 4:
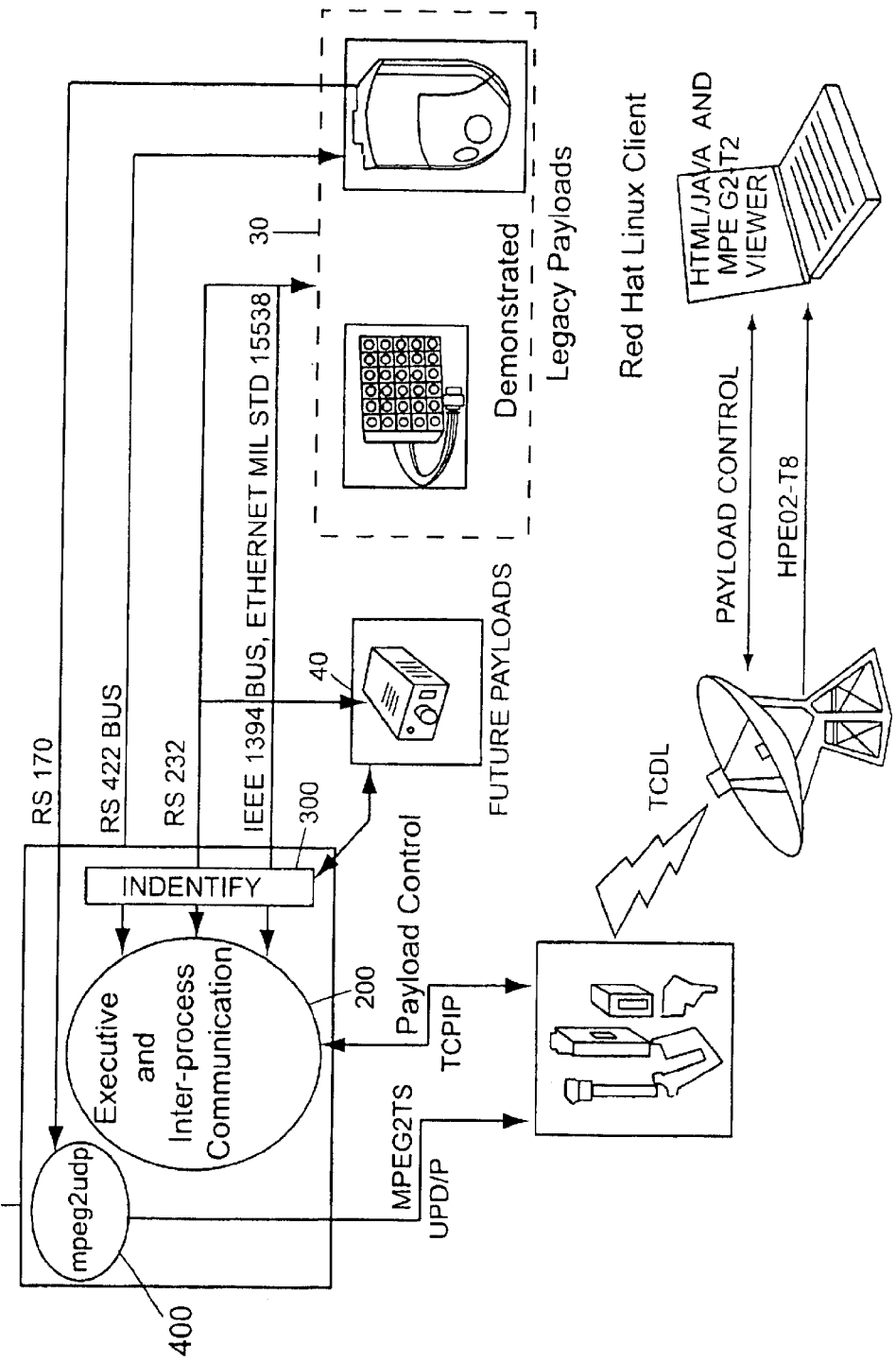
FIG. 4 is a system-level block diagram of the software components according to the present invention.

FIG. 4 is a system-level block diagram of the software components according to the present invention.

To effectively make the mission payload 30 and any future payloads 40 plug & play (PnP), payload-specific software modules are loaded into the payload interface controller (PIC) 10 (in vehicle 5) at the time that payload 30 is installed. Each payload interface software module serves as a "plug-in" to existing control software 200 in payload interface controller (PIC) 10 and thereby provides all payload-specific data parameters to allow the payload interface controller (PIC) 10 to interface with the payload 30. An Identify program 300 runs at boot and identifies which payload is connected to which payload connector of the payload interface controller (PIC) 10. The existing control software 200 includes a standardized command set as required to control established payloads 30–50. A more detailed description of the various modules follows.

Identify Program 300

The Identify program 300 executes at boot and identifies which payload is connected to which payload connector of the payload interface controller (PIC) 10. The program 300 performs this by looking for known data streams on each of the data ports available on each connector (two RS-232 interfaces and two RS-422 interfaces). The Identify program 300 runs for 15 seconds or when payloads have been identified on both payload connectors. Once the 15 seconds are up, the Identify program 300 is responsible for writing a configuration file, which the payload interface controller (PIC) 10 executive program 200 reads. The executive program 200 reads this file which contains data on the payload daemon (process) to run, its Logical Identifiers (LID), and the IP communication port for the daemon. A file called 'UAVPayload.properties' is also written which stores payload, LID, and IP port data for the Java client.

Executive Program 200

The executive program 200 initializes the inter-process communications structures, reads the configuration file created by the identify program 300, then begins the execution of the appropriate Payload Interface Software Module and other executable programs as specified in the configuration file.

Payload Interface Software Modules

Each client-side payload interface software module is a web-enable plug-in module stored at the uniform resource locator (URL) address of the payload interface controller (PIC) 10. In this manner, both the control software 200 in payload interface controller (PIC) 10 as well as the interface software at the Human Computer Interface (HCI) 86 may easily access the payload interface software modules, thereby allowing the Human Computer Interface (HCI) 86 to act as a web-based client to allow an operator to remotely control the mission payload 30 via the standardized graphical interface at the Human Computer Interface (HCI) 86. This modular and web-based configuration minimizes software changes required for the Human Computer Interface (HCI) 86 because it moves the software changes away from all flight critical software, and instead simply requires the loading of a new software server module and client plug-in modules in the payload interface controller (PIC) 10 each time that a new payload is installed. Each payload software module provides all payload-specific data communication to allow the executable software 200 in payload interface controller (PIC) 10 to interface directly with the payload 30. Moreover, all physical payload connections are standardized. Likewise, the control and interface software resident at the Human Computer Interfaces (HCIs) 86, 88 is standardized for all payloads. This configuration effectively makes the mission payloads 30–50 plug & play (PnP) since the payload interface software now resides in the payload interface controller (PIC) 10 in the vehicle 5, and all that is needed to exchange payloads is to swap in a new one and load a new server module and client payload interface software. Presently, the payload control software must be installed at both the payload interface controller (PIC) 10, the datalink control processor (DCP) 70 and the Human Computer Interfaces (HCIs) 86, 88, albeit it is equally possible to accomplish this with a single load at one end and a download to the other. In either case, loading and subsequent accessing is further simplified by making the payload interface software at both the payload interface controller (PIC) 10 and at the Human Computer Interfaces (HCIs) 86, 88 modular and web-based. In other words, each new payload is associated with a new payload server-side control module and client-side web-base plug-in which allows software to control the payload and display the status information and data from the sensors. This way, as new payloads are developed, new server-side payload control modules and client-side Java control panel or group of panels are added. These comprise a specifically developed interface for the control of specific payloads. Thus, when the new payload is introduced, it is physically installed and a new server-side payload control module and new Java control panel or group of panels are installed on the payload interface controller (PIC) 10. Upon installation each Java panel is accessed from a single unique uniform resource locator (URL) address. Each panel is designed using the web compatible software of Java which is loaded from HTML so that it can be presented to the operator at the Human Computer Interfaces (HCIs) 86, 88 via a standard web browser with appropriate plug-ins installed, as required. This way, when the payload operator activates a payload command via the web browser screen at a Human Computer Interface (HCIs) 86, 88, the payload interface controller (PIC) 10 on vehicle 5 interprets the command and calls the payload specific command to the proper payload 30–50 via a standard URL interface protocol. The benefit of the foregoing configuration is that it minimizes software changes required for the VMS 20, DCP 70, or Non-Real-Time Processor 82, nor any new Human Computer Interfaces (HCIs) 86, 88. This in turn should alleviate the requirement for full flight certification by moving the software changes away from the flight critical software. It also allows independent development and layout of a standard web-browser for the Human Computer Interface (HCIs) 86, 88 HCI, regardless of the specific mission of a given payload. Appropriate web development software is readily available such as Java and HTML, and the software is easily upgradeable, thereby minimizing the likelihood of becoming obsolete for the life of the vehicle 5. Each payload interface software module is developed specifically for each payload. For example, a Java web panel developed for a daylight Electro-Optic (EO) camera interface comprises all controls required to manipulate the camera in the EO mode including: Iris, field-of-view, focus, auto iris, cage, stow, gyro modes, in addition to stewing the gimbal and viewing the video.

Initial Payload Drivers

The current configuration supports (but is not limited to) the Wescam Model 12DS Daylight TV (DLTV)/Forward Looking Infrared (FLIR) and the Neptune Science's TDROP Dispenser designed for releasing and monitoring of temperature, pressure, and humidity atmospheric dispensers. The initial configuration was designed to support payload communication over the two RS422/RS232 serial ports, but the PC104 hardware and PIC software was designed to support adding of communication to payload devices over Ethernet, 1553, 1394, etc.

Driver for Wescam®

The Wescam Model 12DS DLTV/FLIR is a small lightweight stabilized gimbal maritime surveillance module for observation and tracking from small aircraft. The dual sensor system features a high sensitivity, 3–5 um, 3 field-of-view FLIR, with Indium Antimonide staring array, and a low-light color daylight CCD camera with 20× zoom lens. The system's specifications state that the control stream going into the camera should be at a 30 Hz rate, and consists of frames of 20 bytes of 19200 bit per second, 8 bit, no parity, asynchronous serial data. The message then requires approximately 10.4 milliseconds to send, at a rate of one message every 33.333 mSec.

The Wescam's serial control is designed for a hand controller, which continuously sends a data stream with particular bits representing the position of buttons, etc. on the controller. In addition, the Wescam transmits a continuous data stream that provides status and positioning information. It would be undesirable to send this data stream down a radio link in its raw form, as most of the data over a given period of time would be redundant. For purposes of the present invention, the Wescam driver converts between the Wescam's protocol of using continuous data streams, and the Java client's protocol of reporting and displaying changes in status. Data structures are provided within the Wescam driver that keep status information from the camera, as well as emulate actuation of buttons on a hand controller. Incoming messages from the Java client provide information from the operator such as "Zoom out pressed", "Zoom in pressed", etc. When these messages are received, they are translated into the appropriate changes in status variables. These status variables are read at 30 Hz serial processing to create the control messages to send to the Wescam payload.

Likewise, when messages are received from the Wescam payload, changes are forwarded to the Java client. Each message contains status bits that do not need to be sent to the client: the client only needs to be notified of changes. For example, when the Wescam payload is in FLIR mode, the client needs to know the field of view, a value from 1 to 3. This value is encoded in the data frame sent to the payload interface controller (PIC) 10 by the Wescam payload, but certainly does not need to be transmitted to the client 30 times per second. The payload interface controller (PIC) 10 informs the Java client any time a change occurs in status from the Wescam payload, as well as periodically updating even if there is no change. In order to further conserve downlink bandwidth, the analog information reporting frequency is reduced from 30 times per second to 5 times per second.

Driver for TDROP

Bae Systems® aircraft-deployed Tactical DropSondes (TDrop) provide real-time battlefield environmental data. The Tactical DropSondes Dispenser developed by Neptune Science, are deployed from UAVs using existing inventory chaff/flare dispenser sets. This capability is accomplished without requiring any modifications to the aircraft or to the chaff/flare dispenser set. Tactical DropSondes can be configured with an array of sensor packages to include meteorological sensors, chemical agent detection sensors, biological agent detection sensors, acoustic sensors, ASW sensors, and electronic warfare payloads. Each Tactical Sensor contains a 12 channel GPS receiver, a Motorola Power PC processor, VHF or UHF transmitter (can support all 99 sono-buoy channels), batteries, parachute, and the mission specific sensor package. As the Tactical DropSonde is ejected into the air stream, a parachute and RF transmit antenna deploy; and data transmission via the UHF/VHF data link begins. Within seconds, sensor data, along with GPS position, altitude, and wind velocity data, become available to the user.

The TDROP driver program is responsible for receiving commands from the Java client and converting these commands into RS-232 serial words understandable by the TDROP dispenser. The program also receives RS-232 data and status messages from the TDROP and forwards this data to the Java client. The TDROP sends three different data sets, which include GPS data, Nova data, and Vaisala data. GPS data is sent at a 1 Hz rate and originates from the TDROP's GPS receiver. Vaisala data includes TDROP temperature, humidity and pressure from the Vaisala sensor and is transmitted at a 0.2 Hz rate. NOVA data originates in the dispensed dispenser and is received by the TDROP's Nova radio. This data is then transmitted out the RS-232 interface at a 0.2 Hz rate. The TDROP dispenser has the ability to fire 30 different DropSondes, preloaded and preconfigured on the ground. Selection, Arm and Fire Status are received from the TDROP and relayed to the Java client for update on the TDROP client panel.

Inter-Process Communication

Each payload connected to the payload interface controller (PIC) 10 is controlled by a separate process; Unique Logical ID's (LID's) are assigned to each process and for its peer, the Java client executing in the workstation which is to control the payload. A shared library (libpnputils.so) was created to provide for fast, data/event-driven interprocess communications within the payload interface controller (PIC) 10. Inter-Process Communications (IPC) is accomplished through the use of shared memory buffers with pointers passed through First-In First-Out (FIFO) pipes, eliminating unnecessary copying of data passed between processes.

Mpeg2udp 400

The mpeg2udp program is designed to be responsible for reading the MPEG2 Transport Stream from the serial port of the MPEG-2 encoder card and sending it to the client in UDP/IP packets. There are two parts to this process: the device driver and the mpeg2udp program itself.

The device driver provides the interface between the operating system and the RS-422 serial card. The incoming data stream from the MPEG-2 encoder card is formatted a synchronous data stream of MPEG-2 Transport Stream packets; each containing 188 octets formatted as 32-bit words, most significant bit first. The device driver synchronizes the hardware in the serial card to the incoming data stream, and makes the resulting incoming data available to the mpeg2udp program. Because the RS-422 card adheres to the data communications convention of least-significant-bit first, the bit order of each byte passed to the mpeg2udp program is reversed.

The mpeg2udp program continually loads buffers from the device driver, checks for the TS header byte every 188 bytes, reverses the order of the bits in every byte received, and sends frames of complete TS packets to the client via UDP/IP.

Client Software Description at the Human Computer Interface (HCI) 86

The Human Computer Interface (HCl) 86 is equipped with a NetStream 2000 card due to its ability to handle streaming MPEG-2 Transport Streams and the availability of Mircosoft Windows and Linux drivers. Version 0.2.042.2 of NetStream's Linux drivers are suitable.

The Human Computer Interface (HCI) 86 operating system (OS) is RedHat (RH) Linux 7.1. RedHat Linux is the most common of the Linux distributions available. Gnome Desktop can be used as an X Windows window manager (this is part of the RH 7.1 distribution disks). Other installed client software is provided with the RedHat 7.1 distribution with the exception of:

Netscape 4.77.

Sun Microsystem's Java Runtime Environment (JRE) version 1.3.1 for Linux.

NetStream2000 drivers and examples.

Microsoft Windows Client

The Windows 98 system had these software applications installed:

Netscape Navigator Version 4.7x,

Microsoft Internet Explorer Version 5.x,

Sun Microsystems Java 2 Runtime Environment, Standard Edition, including Java Plug-in Version 1.3.x., StreamRider 3.5 from 2NetFX.

HTML and Java Client Interfaces

The Executive program 200 downloads payload interface software from the payload interface controller (PIC) 10 on the Unmanned Aerial Vehicle (UAV) via a standard web server. There are four types of software interfaces in the client software; the HTML interface, the UAV payloads properties file, payload panel classes, and the network message handlers. This is a modular design that allows for rapid integration of new payloads in the future.

a. HTML Interface

The payload interface controller (PIC) 10 has installed a standard web server (Apache). The Java client software is downloaded from the Payload interface controller (PIC) 10 web server via a Hyper Text Markup Language (HTML) web page using HTML's standard APPLET tag. The web page was run through Sun Microsystems Java Plug-in HTML Converter Version 1.3. This converter re-writes the standard HTML page so that it uses the Java Plug-in Version 1.3.x. from Sun Microsystems in the client's web-browser. Both Netscape 4.7x and Microsoft Internet Explorer 5.x are supported.

When the client's web-browser connects to the Payload interface controller (PIC) 10 HTTP web address it downloads the 'PayloadControl.jar' (containing all the Java class files), the PayloadControl.properties' file, the UAV Payloads property file, and a unique property file for each Java payload panel (optional). Then the PayloadControl Java applet is started in the client's web-browser.

b. AV Payloads Properties File

Once the PayloadControl Java applet is started, it immediately reads the 'PayloadControl.properties' file and the 'UAVPayloads.properties' file. The 'PayloadControl.properties' file reads in the host name or IP address of the Payload interface controller (PIC) 10. The 'UAVPayloads.properties' file contains all the information defining which payloads and TCP socket connections are available on the Payload interface controller (PIC) 10. The following is an example of the 'UAVPayloads.properties' file that is written by the Payload interface controller (PIC) 10's server software.

payload.controller=0,1,60671 payload.echo=0,1 payload.count=2 payload.1=4,5,60673,WescamPanel,Wescam payload.2=2,3,60672,TDropPanel,TDrop where, payload.controller=this entry defines the logical ID of the Payload interface controller (PIC) 10, the logical ID of the PayloadControl applet, and the TCP socket used for communication with PIC 10.

payload.number=this entry defines number of payloads connected to the PIC. payload.#=there is one entry for each active payload. This entry defines the logical ID of the PIC for this unique payload, the logical ID of the payload, the TCP socket used for communication, the Java Panel class name for the payload, and the text label to be on the payload's tab pane.

c. Payload Panel Classes

Once the PayloadControl applet has read the 'UAVPayloads.propertie' file, it will use the Java Panel class name and load the Java panel classes using Reflection methods to load classes on the fly. If the payload.number=0 no payload panels will be loaded at runtime.

To enforce a standard framework for panel design and loading using Reflection, all payload panels must be extended from Java's JPanel class, implement a ChangeListener class (to send and receive network messages), and implement a standard fixed (pre-defined) class constructor. Here is the class declaration and constructor for adding a new payload: public class PayloadNamePanel extends JPanel implements ChangeListener public PayloadNamePanel(String host, int port, int lid, int pid, AppletContext context).

The constructor has five arguments in its argument list as follows:

- host—this is the host name of the system operating as the PIC 10, read from the 'PayloadControl.properties' file. The same host name is passed into all panels.
- port—this is the payload's unique TCP port used to communicate with the Payload interface controller (PIC) 10, read from the 'UAVPayloads.properties' file.
- lid—this is the payload's logical ID read from the 'UAVPayloads.properties' file.
- pid—this is the Payload interface controller (PIC) 10's logical ID read from the 'UAVPayloads.properties' file.
- context—this is the Java AppletContext of the PayloadControl applet. The same context is passed into all panels.

All other properties that are unique to a specific payload are loaded from the payload's own property file.

Network Message Handlers

The individual payload client plug-in 30 communicate with the payload interface controller (PIC) 10, over a unique TCP socket, via two reusable network classes, the PICRecvMessage and PICSendMessage classes. Each new payload must instantiate each class, start each class in a thread, and add each as a PropertyChangeListener in order to send and receive messages to and from the payload interface controller (PIC) 10.

Message Management

Messages are managed by writing a Java ChangeListener for the network communication classes. Network events have 3 properties: the properties old value, the properties name, and the properties new value. The properties old value is always set to 999 for a valid network message, to get the event's old value call the PropertyChangeEvent's getOldValue() method. The send socket has a property name of "SEND", the receive socket has a property name of "RECV", to get the properties' name call the PropertyChangeEvent's getPropertyName() method. The new value stores the network message status, −1 is a socket error, 0 is status only, and 1 is a valid message. To get event's new value call the PropertyChangeEvent's getNewValue() method.

Figure 5:
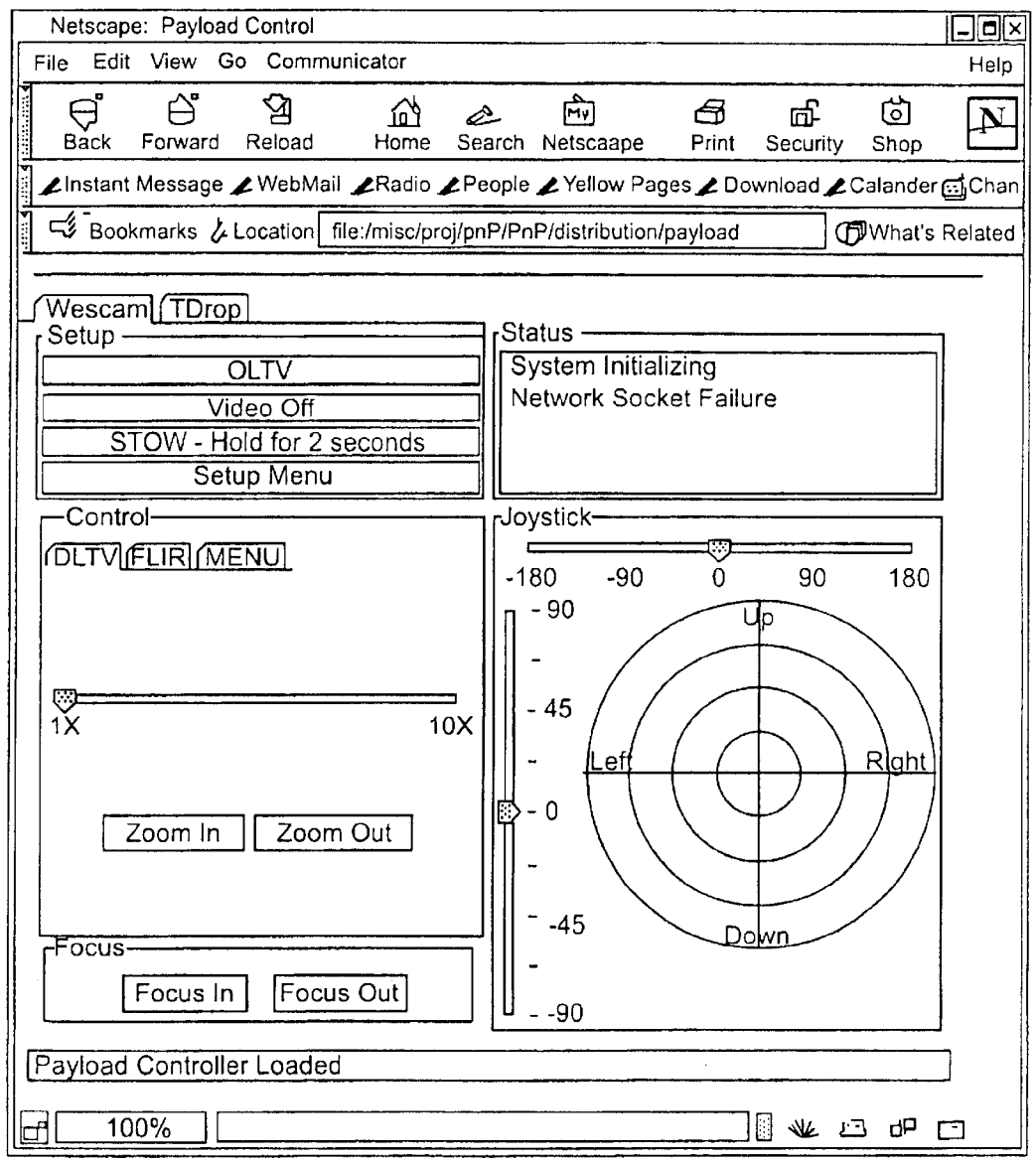
FIG. 5 is a screen prints of an exemplary Payload Control Panel for controlling a Wescam payload.
Figure 6:
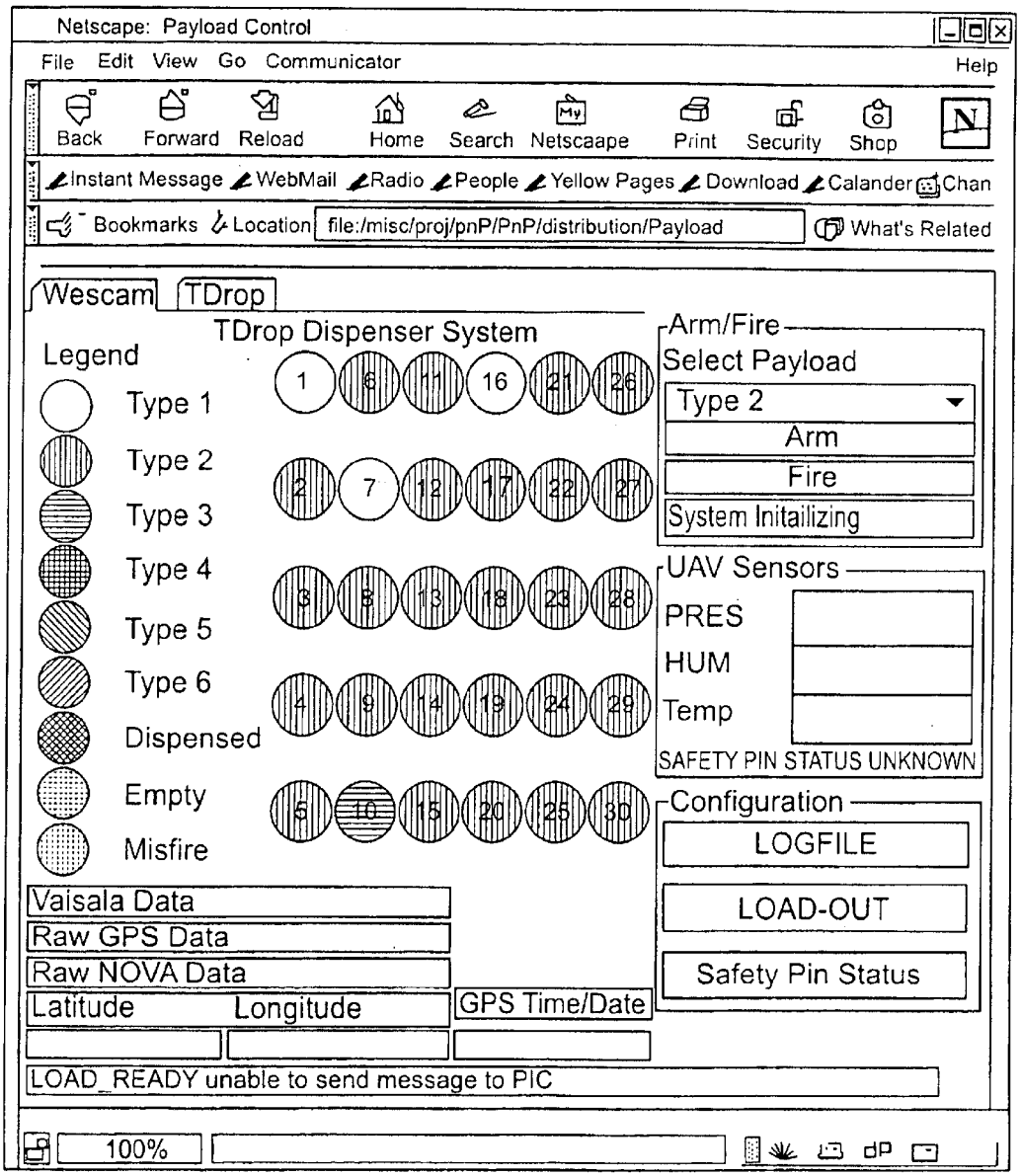
FIG. 6 is a screen prints of an exemplary Payload Control Panel for controlling a TDROP payload.

FIGS. 5 and 6 are screen prints of exemplary Payload Control Panels, graphical Java interfaces used to control the payloads 30–50. Specifically, FIG. 5 is used for controlling a Wescam 12DS payload, and FIG. 6 is used for controlling a TDROP payload.

The foregoing open systems architecture increases the ability to integrate and field new mission payloads quickly and effectively by minimizing software modifications and safety of flight concerns. The shift of payload specific software away from the flight critical software reduces and may eliminate the flight certification process for new payload integration efforts. While the forgoing open systems architecture has been described in the context of unmanned serial vehicles (and their control systems), it has definite application to all manned and unmanned platforms that may require modularity and integration of mission payloads in the future. The design and implementation will not preclude it from being incorporated into ground vehicles, space vehicles, and underwater vehicles.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

We claim:

1. A software system for remote control of any of a variety of different payloads in a vehicle, comprising:
   - a software module resident on a dedicated payload interface controller in said vehicle and containing payload-specific data parameters;
   - a software application resident on said payload interface controller and including a standardized command set as required to control multiple different payloads, said software application incorporating the data parameters of the software module into said command set for issuing payload-specific commands to said payloads.

2. The software system according to claim 1, wherein said software module resident on said dedicated payload interface controller serves as a plug-in to said software application to allow the payload interface controller to interface with a payload.

3. The software system according to claim 1, further comprising an identify program that runs at boot-up to identify a payload connected to the payload interface controller and to populate a configuration file in accordance therewith.

4. The software system according to claim 3, wherein said software application boots to initialize the standardized command set, reads the configuration file created by the identify program, and then executes the appropriate payload-specific software module.

5. The software system according to claim 1, wherein said payload-specific software module is a web-enabled plug-in module.

6. The software system according to claim 5, wherein said payload-specific software module is a web-enabled plug-in module stored at a uniform resource locator (URL) address of said payload interface controller.

7. The software system according to claim 1, further comprising a Java client interface coupled to a server by the standardized command set through a TCP socket.

8. The software system according to claim 7, wherein the server interfaces with the payloads.

* * * * *